April 24, 1956  J. C. EVANS  2,742,812
REFLEX GUNSIGHT

Filed March 20, 1953  3 Sheets-Sheet 1

INVENTOR
JOHN C. EVANS

BY
ATTORNEYS

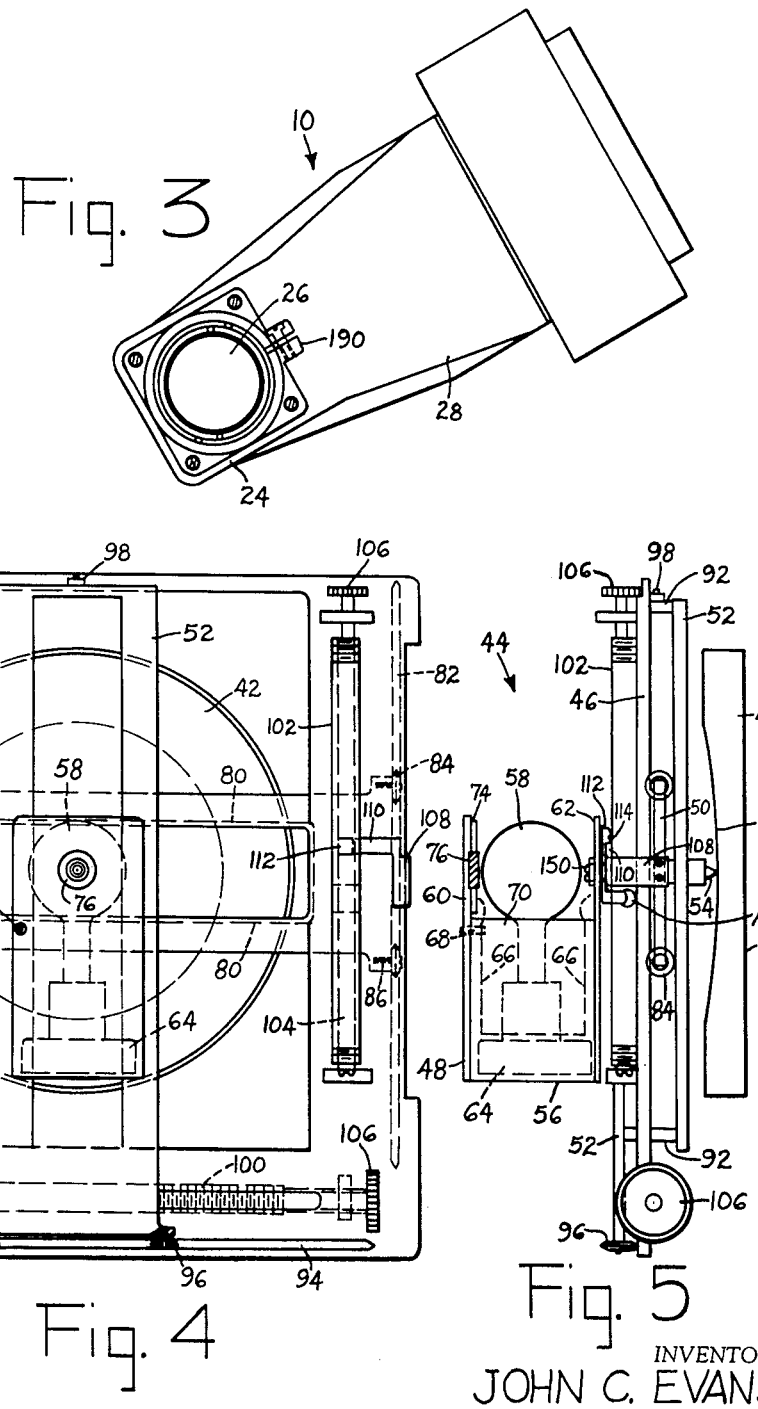

April 24, 1956   J. C. EVANS   2,742,812
REFLEX GUNSIGHT

Filed March 20, 1953   3 Sheets-Sheet 3

INVENTOR
JOHN C. EVANS
BY
ATTORNEYS

United States Patent Office 2,742,812
Patented Apr. 24, 1956

2,742,812

REFLEX GUNSIGHT

John C. Evans, Rochester, N. Y., assignor to the United States of America as represented by the Secretary of the Navy Application March 20, 1953, Serial No. 343,656

13 Claims. (Cl. 88—1)

This invention relates to an apparatus and method of imaging a gunsight reticle to enable the pilot to sight his target from a normal flying position in the cockpit without the necessity for moving forward in his seat.

An object of the invention is to provide a gunsight that will project a reticle image in front of the pilot at the exact focal distance from his eye at all times even though the flight path of the airplane is constantly changing.

Another object of the invention is to provide a gunsight adapted to use the information output of a gunsight computer to keep the reticle in proper focus for the pilot.

Another object of the invention is to provide a gunsight mechanism adapted to provide travel on the X, Y and Z axes for the reticle in order to maintain the reticle image at the proper focal distance.

Still another object of the invention is to provide a device used either as a training means or for use in actual combat.

Yet another object of the invention is to provide a novel reticle carriage to move the reticle assembly on a vertical or horizontal axis, as may be desired.

A specific object of the invention is to provide means to readily remove the reticle lamp assembly from the gunsight without danger of damage to the transport mechanism.

A feature of the invention resides in the use of a cam plate and follower adapted to align the reticle so that the reticle image appears at the optical center of the reflex mirror.

Figure 1:
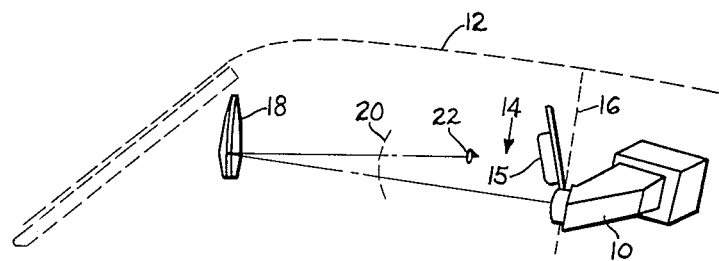
Figure 2:
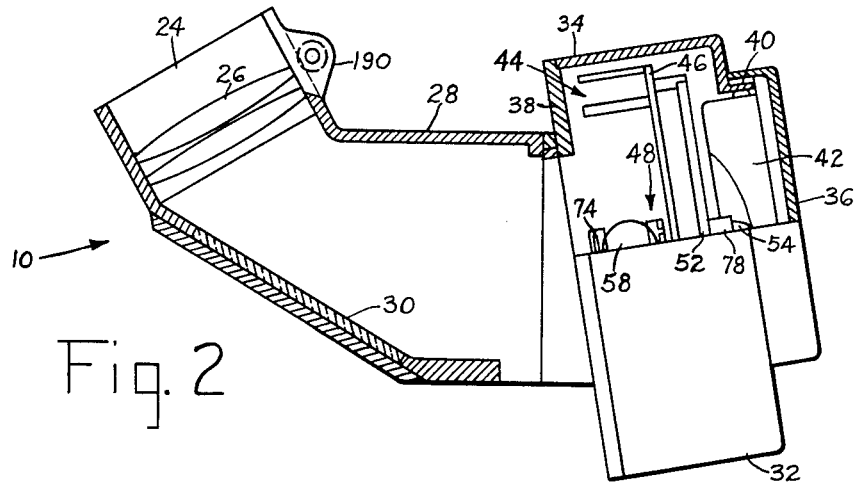
Figure 6:
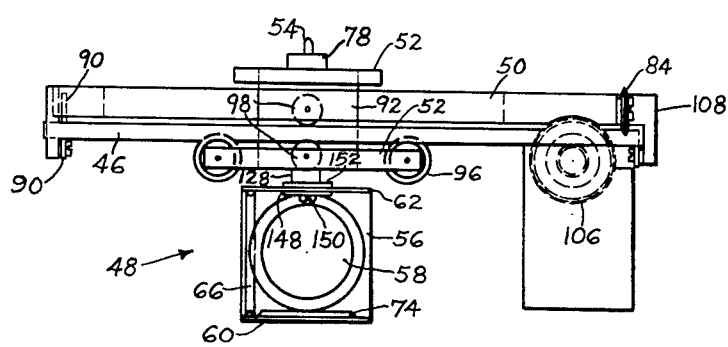
Figure 7:
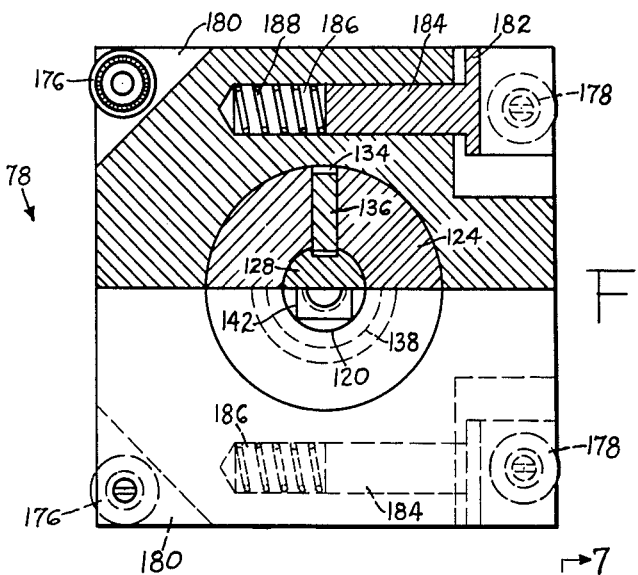
Figure 8:
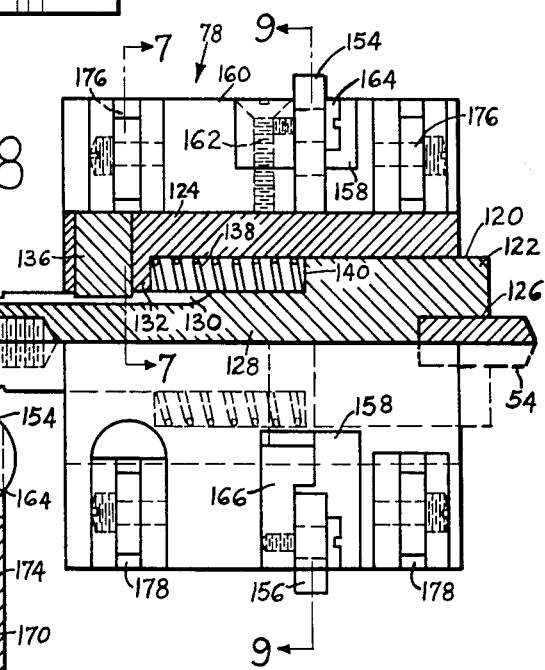
Figure 9:
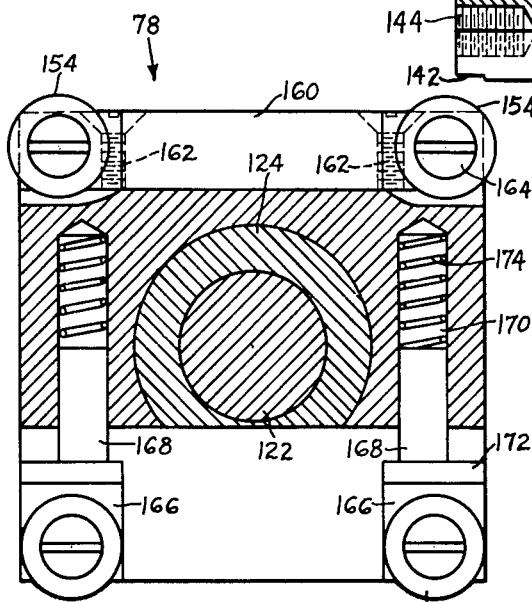

Other objects and many of the attendant advantages of this invention will be readily appreciated as the same becomes better understood by reference to the following detailed description when considered in connection with the accompanying drawings wherein:

Figure 1 illustrates the gunsight mounted in the cockpit of an airplane,

Figure 2 is a view of the gunsight, partly cut away, with the reticle and lens assembly clearly shown, Figure 3 is a front view of the gunsight, Figure 4 is a vertical elevation of the reticle transport assembly for adjustment of the reticle, Figure 5 is a side elevation of the reticle transport assembly seen in Figure 4, and illustrates the reticle in section, Figure 6 is a top plan view of the reticle transport assembly, and Figures 7, 8 and 9 illustrate the construction, partly cut away, of the cam follower mechanism. Figure 7 is taken on line 7—7 of Figure 8 with the lower half of the mechanism shown in elevation, and Figure 9 is taken on line 9—9 of Figure 8 with the rollers as well as the stud brackets shown, in elevation.

Referring to the first three figures, the projector unit 10 is illustrated in mounted position in the cockpit 12 of an airplane. Gunsight projector 10 is mounted behind the pilot's left shoulder adjacent his seated position at 14 in front of cushion 15 with only the lens portion of projector 10 extending through the rear cockpit wall 16. Reflex mirror 18 is mounted on the forward end of cockpit 12 at a point above the instrument panel in a manner not to interfere with manipulation of various controls or observation of the instruments mounted on the panel.

The focal surface of reflex mirror 18 is indicated at 20 in Figure 1. Mirror 18 is a reflx plate with the center of curvature lying approximately midway between the observer's left eye and the center of the aperture stop at the projector. An object lying in this surface appears to the eye 22 of the observer to be projected in front of him at infinity. Projection unit 10 is designed so that an image of a reticle is formed and is automatically kept in the focal plane 20 of reflex mirror 18, as will presently be explained. In this manner the pilot can shoot his guns without shifting the position of his head and eyes when the target and reticle become aligned.

Gunsight projector 10 consists of a forward lens housing 24 mounting lens doublets 26 therein, a center mirror box housing 28 retaining plane mirror 30 for deviating the optical axis of the projection system, and a reticle assembly housing 32.

Due to the limited space in the cockpit of the airplane, projector 10 must be compactly constructed and as a result, the necessary close spacing of lens doublets 26 produces astigmatism. The parallax error introduced by astigmatism is reduced by focusing the system between the center and periphery of reflex mirror 18. This is explained in greater detail in the co-pending case referred to above. Because of the lens astigmatism, movement of the reticle causes a change in the image focus. Since the gunsight reticle is designed to form a focal image that is automatically kept in the focal plane of reflex mirror 18, means must be provided to compensate for changes in the focal image when the reticle is moved.

A reticle assembly 44 has been constructed to automatically provide the adjustments necessary to keep the reticle image at the required focal distance. Housing 32 provided for reticle assembly 44 includes a reticle assembly section 34 and a cap 36. The forward end of section 34 abuts, in sealing engagement, the flange 38 extending from mirror housing 28. The rear section of housing 32 terminates in reduced circular flange 40, threaded on the exterior surface thereof to retain cap 36. Cam plate 42 is mounted in any desired manner within flange 40. A limited amount of rotation for reticle assembly 44 is provided, when desired, to align the reticle so that movement lies in a horizontal and vertical plane.

Reticle assembly 44 comprises a frame or base plate 46, reticle housing 48, reticle transport carriages 50 and 52 and cam follower 54.

Reticle housing 48 is of U-shaped construction with the connecting leg 56 retaining filament lamp 58 thereon. Thus lamp 58 is mounted between vertical legs 60 and 62. Lamp 58 is of two-filament design and is adapted to have one filament at a time in use. As a result, when one filament burns out, the other filament, by means of suitable connections, not shown, can be operated to provide the required light for the reticle. The purpose for this is to prevent failure of the gunsight in emergencies. Lamp base or socket 64 is retained in housing 48 by means of spring yokes 66 extending across the top of lamp base 64 and vertically along legs 60 and 62 of housing 48. Detents 68 on yokes 66 extend through legs 60 and 62 to releasably retain lamp 58 in seated position in housing 48. Bracing means 70 are provided, if necessary.

Reticle housing leg 60 is apertured adjacent lamp 58 and retains thereon a similarly apertured washer 74. Gunsight reticle 76 is retained within the washer aperture, as is illustrated in section, in Figure 5. In this manner, upon lighting lamp 58, the image of reticle 76 is projected to coincide with the focal plane of reflex mirror 18 at 20. Reticle 76 may be made of any suitable material, and contains the customary rings and cross hairs.

The device is designed to be used both as a training device and in actual combat. The position of reticle 76 is adjustable in three dimensions by being operatively connected with the aircraft gunsight computer and its position in the projector is therefore controlled by the output of yaw, pitch, roll, etc., obtained from such computer, in order to maintain the reticle image at the proper focal position and with the proper lead or lag position with respect to the target. Any desired operating means, such as reversible motors, motors with limiting stops and switch mechanisms, etc., can be used to provide the required movement for the reticle. Since neither the computer nor the driving means forms a part of the invention, they have not been illustrated.

The reticle-lamp assembly is driven in a two-coordinate slide system by means of transport carriages 50 and 52, perpendicular to the optical axis of the reticle. This provides the X and Y movement for reticle 76. In order to obtain the Z or longitudinal position of the reticle, cam follower 54 is adapted to travel along the concave surface of cam plate 42, as will presently be made clear.

Reticle housing 48 is supported for movement in all three planes by means of a mounting block designated generally at 78 in Figures 2 and 6. Movement in a vertical plane for reticle 76 is obtained by means of the tracks or carriages 50 and 52 respectively. Carriage 50 comprises a single rectangular frame cut away to form two parallel inner channel tracks 80, each being channel shaped in cross section. Carriage 50, providing vertical movement for the reticle, is positioned between a pair of spaced parallel carriages 52 as seen in Figure 6 and in perpendicular relation thereto. An elongated groove or channel 82 is provided on frame plate 46 to provide a V-shaped trackway for accurately guiding the V-shaped peripheries of wheels 84 mounted in any convenient manner at 86 on the edge of carriage 50. A bracket 88 on the opposite edge of carriage 50 carries idler rollers 90 to retain carriage 50 on plate 46.

Parallel carriages 52 are also of rectangular frame construction and are mounted for travel together on frame plate 46 in spaced relation to each other by means of connecting brackets 92. A channel 94, similar in construction to channel 82, is provided in frame 46 to receive therein two horizontal travel wheels 96 mounted on one edge of front carriage 52. Idler rollers 98 are mounted on bracket 92 connecting the upper ends of carriages 52, as illustrated in Figures 4 to 6, to insure frictionless movement of the reticle. The sizes of the inner cutout portions of carriage means 50 and 52 are determined by the size of cam follower assembly 78.

The drive means for carriages 50 and 52 comprise the horizontal lead screw 100 and vertical lead screw 102 respectively. Lead screws 100 and 102 are recessed in elongated slots 104 for compactness of construction and are rotated through suitable gears 106, actuated by any desired means, to drive carriages 50 and 52 on the X and Y axes. The motors or other means for rotating the screws and the form of reduction gearing required to insure proper reduced speeds of screw rotation form no part of the present invention, and have therefore been omitted. A metal strap 108 is secured to carriage 50 and extends across the edge of frame 46 to retain a resilient strip 110 thereon, strip 110 overlying lead screw 102. Depending from the free end of strip 108 as illustrated in Figures 4 and 5, is a metal follower 112 with serrated edge 114 riding on lead screw threads 102. A guide roller 109 is also shown in Figure 5 depending from strip 108. The strap construction described above is also provided for lead screw 100 and therefore requires no separate description. The engagement between the screws and followers results in movement of carriages 50 and 52 along the X and Y axes to position the reticle 76 according to the rotation of the screws by gears 106.

Referring to Figures 7 to 9, the construction of mounting block 78 is illustrated in detail. Mounting block 78 retains cam follower 54 for movement on the three dimensional cam 42. Cam follower 54 is preferably constructed of any suitable hard material, as for example, "Nylon," synthetic sapphire, etc. Cam plate 42 is preferably constructed of transparent material, such as "Lucite" or the like, so that the centering of reticle 76 can be observed by simply removing cap 36 from projecture unit 10. Cam 42 is provided with a rear plane surface 116 and a concave surface 118 on the forward edge so that movement of cam follower 54 on the concave surface serves to move reticle 76 forwardly or rearwardly, to provide the Z axis and to thereby maintain the focal image of the reticle coincident with the focal plane of reflex mirror 18.

Mounting block 78 is axially bored throughout the length thereof to receive bushing 124. Bushing 124 is axially bored at 120 to receive plunger 122 therein for sliding movement. Plunger 122 comprises an elongated shaft and is of a length sufficient to extend beyond each end of mounting block 78. Plunger 122 is bored at its rear end at 126 to retain therein cam follower 54. Plunger shaft 122 is of reduced diameter intermediate its length at 128 and is slotted to provide a keyway 130. Bushing 124 is provided with an internal annular shoulder 132 at the forward end thereof and is apertured at 134 to receive key 136. Key 136 extends into keyway 130 in plunger 122 to permit guided sliding movement of plunger shaft 122 while at the same time preventing rotative motion. Resistance to the forward movement of plunger 122 is provided by compression spring 138 mounted on the reduced section 128 of plunger shaft 122 and retained in position by seating against annular shoulder 132 on bushing 124 and shoulder 140 on plunger 122.

The forward end of plunger shaft 122 is cut down at one end to produce a rectangular shaped stub portion 142 which is internally threaded at 144. This reduced square end 142 enables portion 128 of shaft 122 to extend through rectangular slot 148 in leg 62 of reticle housing 48 (see Figure 6). Fastening means such as screw 150 extends through slot 148 into threaded bore 144 to maintain plunger 122 fixed on reticle housing 48 for movement of reticle 76 as cam follower 54 rides on surface 118 of cam 42. Rectangular apertured washers 152 (Figure 6) are provided, if desired.

To enable reticle 76 to move along the X and Y axes, mounting block 78 is adapted to be maintained for vertical and horizontal movement in carriages 50 and 52. Block 78 is positioned within the inner trackways of the carriage members at the point where the carriage members cross each other.

Horizontal travel on vertically movable carriage 50 along rails 80 is provided by upper and lower roller wheels 154 and 156, respectively. These wheels are positioned along the upper and lower edges of mounting block 78. Thus, they are each adapted to travel in a respective channel or track 80 provided in carriage 50, which carriage is positioned between the spaced parallel carriage members 52 as shown in Figure 6. Mounting block 78 is provided with upper and lower rectangular channels 158 extending in parallel relation with tracks 80. An extension block 160 is positioned within upper channel 158 and is of a length equal to channel 158 but of somewhat lesser width. Extension block 160 is secured on mounting block 78 by any desired means as by retaining screws 162. Ball bearing rollers 154 are retained on extension block 160 by screws 164 in the space in channel 158 provided by the reduced diameter of the extension block. These rollers rotate in upper channel track 80. While the fastening means, for convenience, are shown to be screw members, it is obvious that other means to secure the elements in the device may be readily substituted which would fall within the scope of the present invention.

It is desirable to provide a small amount of flexible movement in the tracks to prevent binding. This is obtained in tracks 80 by means of springs that adjust in one direction and keep the rollers in alignment.

L-shaped stud brackets 166 are provided for lower roller wheels 156. Since all the brackets 166 are identical in construction, a description of one will be sufficient. Stem 168 extends into an elongated bore 170 in mounting block 78 and is secured to the shorter arm 172 of stud bracket 166. Stem 168 is shorter than bore 170 and seats against a compression spring 174 retained in said bore. Spring 174 urges roller wheel 156 outwardly into track 80, and thus insures sufficient flexibility of movement to prevent binding action while reticle 76 is being kept aligned with the focal image of mirror 18. It will be noted at this point that tracks 80 not only serve to permit horizontal movement for reticle 76 and block 78 but also is the means by which the assembly is prevented from falling out from between carriages 50 and 52.

Movement in a vertical direction along the trackways of carriage members 52 for reticle 76 is provided by means of ball bearing rollers 176 and roller wheels 178. It will be understood that a description for each type of roller will apply to all similar rollers. Rollers 176 and 178 ride on the inner surfaces of the cutout edges of carriages 52. Roller 176 is rotatively maintained within triangular slot 180, the slot being just large enough to provide clearance for rotation of ball bearing roller 176 which extends slightly beyond the edge of block 78 to ride on the smooth inner surface of carriage 52. Some alignment is permitted in the provision of spring tensioned means for rollers or wheels 178. A Y-shaped yoke 182 retains roller 178 between the parallel ears of said yoke for rotation and travel on the inner surface of carriage 52. The stem 184 of yoke 182 extends into an elongate bore 186 in block 78 in a manner similar to stem 168. Also, similarly, bore 186 is of greater length than stem 184 and receives therein a compression spring 188 to abut against the end of stem 184.

Suitable electrical connections, not shown, are provided for the double filament lamp 58 and to drive the servo mechanisms or other drive means used.

The projection unit 10 and reflex mirror 18 are mounted in the relation illustrated in Figure 1. Projector unit 10 is mounted primarily behind the pilot's seat with lens housing 24 extending through the armor plate 16. Angle brackets or mounting fins 190 are provided on gunsight projector 10 as needed to retain the unit in the required angular position in the cockpit.

With the electrical connections complete, the switch to operate the reticle is turned on and carriages 50 and 52 are operated until the "nylon" cam follower 54 is centered on concave cam 42. Cap 36 is removed in order to view the cam. Reflex mirror 18 and projector 10 are then oriented so that the reticle image is formed in the focal plane 20 of reflex mirror 18. The reticle image thus appears to the eye of the observer to be projected at infinity.

With the projector and reflex mirror correctly positioned, horizontal reticle drive screw 100 is operated to determine if reticle motion lies in a horizontal plane, by referring to some reference horizon line that can conveniently be viewed through the reflex mirror. If the image of the reticle appears to travel a non-parallel course relative to the horizon line, the reticle head assembly consisting of the reticle transport system and housing can be rotated, by loosening the locking screws, not shown, and locked in the correct installation in the aircraft cockpit. Movement of the reticle 76 on the X and Y axes is thus provided by travel of carriages 50 and 52 in a two coordinate slide system which is perpendicular to the optical axis. Roller wheels 154, 156, 176 and 178 ride in carriages 50 and 52 to provide vertical and horizontal movement for reticle 76. Compression springs 174 and 188 provide flexibility for the rollers to assist in keeping mounting block 78 in alignment on the carriage surfaces.

The focal length of projector lens 26 is short, due to the limitations of available space found in cockpit 12, and as a result, there is astigmatism. Astigmatism can be reduced with increased length of the projection unit. Due to the space limitations of the cockpit, this is not practical and compensation must be provided in other ways. When the reticle in projector 10 is driven over concave spherical cam 42 with its center off the optical axis, the longitudinal movement of plunger 122 and reticle 76 compensates for the astigmatism. In this manner the coincidence of the projected reticle image surface with the reflex mirror focal surface at 20 is maintained.

Obviously many modifications and variations of the present invention are possible in the light of the above teachings. It is therefore to be understood that within the scope of the appended claims the invention may be practiced otherwise than as specifically described.

What is claimed is:

1. A reflex gunsight comprising a reticle projector unit and image reflex means mounted in spaced apart relation to image a reticle in a focal plane, said projector unit including lens means and a reticle, movably mounted carriage means in said projector to move said reticle in a horizontal and a vertical direction in a substantially vertical plane and means to move the reticle in a longitudinal direction substantially perpendicular to said plane, said last named means comprising a concave cam mounted in the projector and a cam follower operatively connected with the reticle and riding on the concave cam to move said reticle in said longitudinal direction.

2. A reflex gunsight comprising a reticle projector unit and image reflex means mounted in spaced apart relation to image a reticle in a focal plane, said projector unit including lens means and a reticle, a carriage frame member mounted for vertical movement in said projector, a second carriage frame member mounted for horizontal movement in said projector, a cam follower operatively connected with said reticle, means to move said reticle in a vertical plane retained within said carriage frame members and slidably receiving said cam follower, and a concave cam secured in said projector and engaged by said cam follower to move said reticle along a horizontal axis.

3. A reflex gunsight adapted to project a reticle image in a focal plane comprising a frame plate, a carriage mounted for vertical movement on said plate, a second carriage mounted for horizontal movement on said plate, a mounting block connected to said carriages and movable therewith, a plunger longitudinally movable in said block, a reticle carried by said plunger, a cam follower on said plunger, and a curved cam plate engaged by said cam follower to move said plunger and reticle longitudinally.

4. The combination of claim 3 wherein said carriages include track surfaces, and roller means on said mounting block riding on said surfaces.

5. The combination of claim 4 wherein certain of said rollers are spring pressed to provide adjustable self alignment with said track surfaces.

6. The combination of claim 5 wherein at least one of said tracks is channeled to receive certain rollers therein in order to retain the mounting block in the carriages.

7. The combination of claim 3 wherein said second carriage comprises two parallel members on opposite sides of the first carriage.

8. A reflex gunsight adapted to project a reticle image in a focal plane comprising a frame plate, vertically and horizontally movable carriage members slidably retained on said frame plate, a mounting block connected to said movable carriage members for sliding movement with said carriage members, resilient means retained in passageways in said mounting block, roller wheels on said mounting block resiliently urged by said resilient means against said carriage members for alignment of the block, a cam follower slidably retained in said mounting block, a reticle secured to and slidable with said cam follower, and an arcuate cam plate in said gunsight on which the cam follower travels for causing forward and rearward movement of said reticle.

9. The combination of claim 8 wherein the roller wheels are each secured to a stud bracket, said stud bracket including a stem extending into the passageway and engaged by the resilient means.

10. The combination of claim 8 wherein the horizontally movable carriage member comprises a pair of parallel frame members and the vertically movable carriage member is positioned between said parallel frame members, said mounting block being retained between the carriage members at their point of intersection.

11. The combination of claim 8 wherein said mounting block includes a transverse passage, a plunger extending through said passage, and carrying said cam follower, resilient means on said plunger and urging said cam follower rearwardly, means securing the front end of said plunger to the reticle, and guide means providing forward and rearward travel for said plunger.

12. The combination of claim 11 wherein said guide means includes a keyway in said plunger and a key secured on said mounting block and received in said keyway.

13. The combination of claim 8 wherein said reticle is supported by a U-shaped housing, said cam follower being secured to one arm of the housing and the reticle mounted on the other arm, and a source of light retained in said housing behind said reticle.

References Cited in the file of this patent

UNITED STATES PATENTS

| | | |
|---|---|---|
| 849,504 | Schanz | Apr. 9, 1907 |
| 1,067,859 | Bacon et al. | July 22, 1913 |
| 1,257,128 | Sheck | Feb. 19, 1918 |
| 1,546,687 | Stutzer | July 21, 1925 |
| 2,183,530 | Alkan | Dec. 19, 1939 |
| 2,464,195 | Burley | Mar. 8, 1949 |
| 2,664,781 | Waller | Jan. 5, 1954 |